(12) United States Patent
Tomar et al.

(10) Patent No.: US 11,049,495 B2
(45) Date of Patent: Jun. 29, 2021

(54) METHOD AND DEVICE FOR AUTOMATICALLY LEARNING RELEVANCE OF WORDS IN A SPEECH RECOGNITION SYSTEM

(71) Applicant: Fluent.ai Inc., Montreal (CA)

(72) Inventors: Vikrant Tomar, Montreal (CA);
Vincent P. G. Renkens, Herent (BE);
Hugo R. J. G. Van Hamme, Leuven (BE)

(73) Assignee: Fluent.ai Inc., Montreal (CA)

( * ) Notice: Subject to any disclaimer, the term of this patent is extended or adjusted under 35 U.S.C. 154(b) by 297 days.

(21) Appl. No.: 16/086,294

(22) PCT Filed: Mar. 17, 2017

(86) PCT No.: PCT/CA2017/050349
§ 371 (c)(1),
(2) Date: Sep. 18, 2018

(87) PCT Pub. No.: WO2017/156640
PCT Pub. Date: Sep. 21, 2017

(65) Prior Publication Data
US 2019/0108832 A1    Apr. 11, 2019

(30) Foreign Application Priority Data

Mar. 18, 2016 (GB) ..................................... 1604592
Mar. 18, 2016 (GB) ..................................... 1604594

(51) Int. Cl.
*G10L 19/00* (2013.01)
*G06F 15/16* (2006.01)
(Continued)

(52) U.S. Cl.
CPC ............ *G10L 15/063* (2013.01); *G10L 15/07* (2013.01); *G10L 15/16* (2013.01);
(Continued)

(58) Field of Classification Search
CPC ... G10L 15/063; G10L 15/07; G10L 15/1815; G10L 15/30
(Continued)

(56) References Cited

U.S. PATENT DOCUMENTS 7,124,081 B1    10/2006 Bellegarda
2002/0138265 A1*  9/2002 Stevens ................... G10L 15/22
                                                         704/251

(Continued)

FOREIGN PATENT DOCUMENTS

WO        2009129315 A1    10/2009
WO     201600188593 A1    12/2016
WO        2017091883 A1     6/2017

OTHER PUBLICATIONS

Driesen et al: "Modelling vocabulary acquisition, adaptation and generalization in infants using adaptive Bayesian PLSA", Neurocomputing, May 2011, vol. 74/Issue 11, pp. 1783-2040.
(Continued)

*Primary Examiner* — Akwasi M Sarpong
(74) *Attorney, Agent, or Firm* — Straub & Straub; Michael P. Straub; Stephen T. Straub (57) ABSTRACT

There is provided a system and method for processing and/or recognizing acoustic signals. The method comprises obtaining at least one pre-existing speech recognition model; adapting and/or training the at least one pre-existing speech recognition model incrementally when new, previously unseen, user-specific data is received, the data comprising input acoustic signals and/or user action demonstrations and/or semantic information about a meaning of the acoustic signals, wherein the at least one model is incrementally updated by associating new input acoustic signals with input semantic frames to enable recognition of changed input acoustic signals. The method further comprises adapting to a user's vocabulary over time by learning new words and/or
(Continued)

removing words no longer being used by the user, generating a semantic frame from an input acoustic signal according to the at least one model, and mapping the semantic frame to a predetermined action.

24 Claims, 3 Drawing Sheets

(51) Int. Cl.

| | | |
|---|---|---|
| G06F 17/16 | (2006.01) | |
| G06F 17/50 | (2006.01) | |
| G06F 15/18 | (2006.01) | |
| G10L 15/06 | (2013.01) | |
| G10L 15/16 | (2006.01) | |
| G10L 15/07 | (2013.01) | |
| G10L 15/18 | (2013.01) | |
| G10L 15/22 | (2006.01) | |
| G10L 15/30 | (2013.01) | |

(52) U.S. Cl.
CPC .......... *G10L 15/1815* (2013.01); *G10L 15/22* (2013.01); *G10L 15/30* (2013.01); *G10L 2015/0635* (2013.01); *G10L 2015/223* (2013.01)

(58) Field of Classification Search
USPC ...................................... 704/232, 9
See application file for complete search history.

(56) References Cited

U.S. PATENT DOCUMENTS

| | | | | |
|---|---|---|---|---|
| 2007/0112554 A1* | 5/2007 | Goradia | ............... | G06F 40/242 |
| | | | | 704/4 |
| 2008/0069437 A1* | 3/2008 | Baker | ................. | G06K 9/6256 |
| | | | | 382/159 |
| 2010/0312556 A1* | 12/2010 | Ljolje | ................... | G10L 15/07 |
| | | | | 704/244 |
| 2011/0004475 A1* | 1/2011 | Bellegarda | ............ | G10L 15/187 |
| | | | | 704/251 |
| 2013/0103623 A1* | 4/2013 | Burstein | ................ | G06N 20/00 |
| | | | | 706/12 |
| 2015/0127321 A1* | 5/2015 | Waibel | .................... | G06F 40/58 |
| | | | | 704/2 |
| 2017/0032779 A1* | 2/2017 | Ahn | ....................... | G10L 15/063 |

OTHER PUBLICATIONS

Tan et al: "Automatic Relevance Determination in Nonnegative Matrix Factorization with the β-Divergence", IEEE Transaction on Pattern Analysis and Machine Intelligence, Nov. 2012, vol. 35, issue 7, pp. 1592-1605.

Ons et al: "Fast vocabulary acquisition in an NMF-based self-learning vocal user interface", Computer Speech and language, Mar. 2014, vol. 28, issue 4, pp. 997-1017.

Chien et al: "Adaptive Bayesian Latent Semantic Analysis", IEEE Transactions on audio, speech and language processing, Jan. 2008, vol. 16, No. 1, pp. 198-207.

Clemente et al: "Incremental word learning: Efficient HMM initialization and large margin discriminative adaptation", Speech Communication, Nov. 2012, vol. 54, issue 9, pp. 1029-1048.

Ons et al, "NMF-Based Keyword Learning From Scarce Data", IEEE Workshop on Automatic Speech Recognition and Understanding (ASRU), Dec. 2013.

Hinton et al: "Deep Neural Networks for Acoustic Modeling in Speech Recognition", IEEE Signal Processing Magazine, Oct. 2012, vol. 29, issue 6, pp. 82-97.

Extended European Search Report for European Patent Application No. 17765625.3, pp. 1-11, dated Sep. 20, 2019.

V. Renkens, V. Tomar and H. Van hamme, "Incrementally learn the relevance of words in a dictionary for spoken language acquisition," 2016 IEEE Spoken Language Technology Workshop (SLT), San Diego, CA, 2016, pp. 144-150.

V. Renkens, S. Janssens, B. Ons, J. F. Gemmeke and H. Van hamme, "Acquisition of ordinal words using weakly supervised NMF," 2014 IEEE Spoken Language Technology Workshop (SLT), South Lake Tahoe, NV, 2014, pp. 30-35.

* cited by examiner

METHOD AND DEVICE FOR AUTOMATICALLY LEARNING RELEVANCE OF WORDS IN A SPEECH RECOGNITION SYSTEM

CROSS-REFERENCE TO RELATED APPLICATIONS

This application claims priority to GB 1604592.4 and GB 1604594.0, both filed on Mar. 18, 2016, and the contents of both being incorporated herein by reference.

TECHNICAL FIELD

The following relates to methods and devices for processing and/or recognizing acoustic signals. More specifically, the system described herein enables incrementally learning the relevance of words in a dictionary for spoken language acquisition.

DESCRIPTION OF THE RELATED ART

The capability of electronic devices is ever increasing, making it more and more difficult to communicate a user's intentions or selections through traditional means, like keyboards, touchscreens and remote controls. Speech is a very natural way of communication for humans, so it has big potential for easy and natural human-machine communication. However, designing a good command-and-control interface for all users is very difficult. The designer must make many choices, and in many cases, it is nearly impossible to satisfy all potential users. For example, the designer must choose what words the user is going to use to name the concepts like actions and objects. Once the designer made a choice the user must yield to the designers choice, so the user must adapt to the technology. It would be more desirable if the technology could adapt to the user instead of the other way around.

Prior art technologies have proposed a spoken language acquisition system that learns a dictionary of spoken words with Non-negative Matrix Factorization (NMF). NMF can find recurring acoustic patterns (like words) and link them to the semantics by separating the contributions of the words in the speech signal. The semantics of an unknown command can then be found by detecting which of the learned words occur in the utterance. Other applications of NMF include music analysis, bioinformatics and image classification.

Prior art language acquisition systems are mostly trained in a batch setting, meaning that all the users data has to be stored and the dictionary is trained from scratch when new data is presented. This is not optimal both in terms of processing power and in terms of memory requirements. The system should be able to learn on the fly and the user should be able to use it while it is still learning. To allow this kind of behavior with batch learning all past commands need to be remembered and the model has to be trained again with every update. This is inefficient both from a memory and a computational view.

Another issue with such systems is that the number of words in the dictionary should be defined beforehand. In prior art systems, the dictionary size is determined by considering how many unique concepts are extracted from all user demonstration plus some extra words that are not linked with a meaning (e.g. "please"), called garbage words. This approach has two problems, (1) this does not consider a scenario where the user uses several words for the same concept and (2) the number of garbage words must be guessed, which can be difficult.

Both problems have been addressed separately in some prior art work. In [1] a technique for automatically learning the relevance of words is suggested. The dictionary can be initialized with a large number of words and at the end of training only the relevant words are kept. This technique is called Automatic Relevance Determination (ARD). In [2] The NMF batch algorithm was adapted to an incremental algorithm.

However, combining the two solutions together to come up with an algorithm that could solve the above two problems together has not been addressed.

SUMMARY

It is recognized that a human speaker typically learns new words (and/or their usage) frequently, e.g., every day, and can forget some previously used words. Therefore, the vocabulary of a human speaker evolves overtime. As such, there is a need for new and different approaches for developing speech recognition systems that can not only learn new words and phrases directly from the end-user but also evolve over time with the user, including removal of words that are not used by the user anymore to keep the model-order and associated computation complexity tractable.

In one aspect, there is provided a method of processing and/or recognizing acoustic signals, the method comprising: obtaining at least one pre-existing speech recognition model; adapting and/or training said at least one pre-existing speech recognition model incrementally when new, previously unseen, user-specific data is received, said data comprising input acoustic signals and/or user action demonstrations and/or semantic information about a meaning of the acoustic signals, wherein said at least one model is incrementally updated by associating new input acoustic signals with input semantic frames to enable recognition of changed input acoustic signals; adapting to a user's vocabulary over time by learning new words and/or removing words no longer being used by the user; generating a semantic frame from an input acoustic signal according to the at least one model; and mapping the semantic frame to a predetermined action.

In another aspect, there is provided a computer readable media comprising computer executable instructions for performing the method.

In yet another aspect, there is provided a system for processing acoustic signals, the system comprising a processor and memory, the memory comprising computer executable instructions for performing the method.

In an implementation of the system, the system comprises a cloud-based device for performing cloud-based processing.

In yet another aspect, there is provided an electronic device comprising an acoustic sensor for receiving acoustic signals, the system described herein, and an interface with the system to perform the action when the mapping is successful.

BRIEF DESCRIPTION OF THE DRAWINGS

Embodiments will now be described by way of example only with reference to the appended drawings wherein.

DETAILED DESCRIPTION

The systems and methods described herein have several advantages and various particular implementations.

As an advantage, the at least one pre-existing speech recognition model comprises both a model of the acoustic signals and the link between the acoustic signal and semantics, while these components are traditionally seen as separate. It is also an advantage that the at least one pre-existing speech recognition model, e.g. dictionary, can be trained incrementally. In other words, a dictionary of learned words can be updated when new data is presented. As a result, the system does not need to keep the historic audio data around to create new models or dictionary from scratch. Learning new model or dictionary from scratch is not optimal both in terms of processing power and memory requirements. More specifically, the memory requirements will remain finite as more learning examples are processed. Apart from the advantage of adapting the model or dictionary, it is an advantage that updating the at least one speech recognition pre-existing model or dictionary instead of learning from scratch provides a better fitting of the at least one model to a user's voice, both at the time of deployment and for future changes.

In an implementation, the incremental learning comprises one or more of a clustering layer and a latent variable layer. Incremental learning based on a clustering and a latent layer have been previously considered, however it is a surprising effect that applying the latter on at least one starting model which is trained on a pre-existing speech recognition model which is trained incrementally enables advantages for the user, also when the method contains a mapping to semantic frames. It is an advantage that out-of-the-box performance is enabled, which is also known as speaker-independent automatic speech recognition. Preferably, one or more of a deep neural network (DNN), convolutional neural networks (CNN), and recurrent neural networks (RNN) with long short term memory (LSTM) units or gated recurrent units (GRU) is used in the clustering layer. In an implementation, the clustering layer is trained on a separate vocabulary speech recognition database and/or on the pre-existing speech recognition model or database of acoustic signals. In an implementation, the latent variable layer comprises one or more of a non-negative matrix factorization (NMF), histogram of acoustic co-occurrence (HAC), DNN, CNN, and RNN that associates input features into the layer to the semantics. In an implementation, the clustering layer and a latent variable layer are trained in advance or off-line on a separate vocabulary speech recognition database and/or on the pre-existing speech recognition model or database of acoustic signals.

It is an advantage that a system can have sufficient pre-trained or pre-existing knowledge to work "out-of-the-box".

In an implementation, the latent variable layer is incrementally learned using automatic relevance determination (ARD) or incremental ARD. It may be noted that ARD has been used in previous work, and is different from incremental ARD (IARD), but herein the terminology ARD and IARD may be used interchangeably for simplicity. It is an advantage that ARD or incremental ARD is used as such to automatically learn new commands and also forget or remove less used older commands. With (incremental) ARD the relevance of the words is learned together with the dictionary. This can lead to savings in the required run-time memory of the system. It is also an advantage that semantics are linked in the latent variable layer. In an implementation, updating the plurality of the models or dictionaries comprises incrementally updating one or more of the latent variable layer and the clustering layer. In an implementation, mapping the semantic frame to a predetermined action comprises incrementally updating the latent variable layer.

It is an advantage that one may choose to not update the clustering layer model. This advantageously enables that the commands can be in any language the user wants, despite the original out of the box working system being a different language. For example, if one would have a system that recognizes 20 commands in English out of the box, then the user can add 10 more command in Dutch. It is an advantage that incremental updates are enabled with ARD, as a result one can add different acoustics for the same semantics. Whether these different acoustics are because of synonyms (e.g. "take" vs "grab") or another language ("door" vs "porte") is advantageously irrelevant for the method described herein.

In an implementation, the method further comprises performing the predetermined action when the mapping is successful.

In an implementation, the semantic frames are generated from user actions performed on an alternate (non-vocal) user interface such as buttons, a keyboard, a mouse with associated GUI, etc. In an implementation, the semantic frames are generated from automatically analyzing the text associated with vocal commands. In an implementation, the semantic concepts are relevant semantics that a user refers to when controlling or addressing a device or object by voice using the vocal user interface (VUI). In various implementations, the acoustic signal is a voice signal.

In an implementation of the method, the semantic frame is generated by processing the input acoustic signal to extract acoustic features, whereby the acoustic features are posteriorgrams, by performing histogram of acoustic co-occurrence (HAC) processing to generate an HAC vector, the HAC vector being processed with one or more latent variable layers to generate a semantic vector to be processed according to a semantic frame structure. In an implementation of the method, the semantic concepts are predefined and a vector is composed in which entries represent the presence or absence of an acoustic signal referring to one of the predefined semantic concepts.

In an implementation, the vector is a fixed length vector. In an implementation, the incremental learning comprises one or more of a clustering layer and a latent variable layer. In other implementations, the clustering layer either a Gaussian mixture model (GMM) or a deep neural network (DNN) is trained, and/or the DNN is further trained incrementally off-line based on the input acoustic signals.

In an implementation, the latent variable layer comprises incremental non-negative matrix factorization (NMF) learning that associates a histogram of acoustic co-occurrence (HAC) features in the utterances to the semantics.

In other implementations: when a plurality of models is learned, the relevance of each model in the plurality of models is determined automatically; when a plurality of models is learned, each irrelevant model in the plurality of models is removed; when a plurality of models is learned, a required number of models is incrementally learned through incremental automatic relevance detection (IARD); and/or when a plurality of models is learned, the number of models is increased upon receiving a new acoustic signal and irrelevant models may be removed using IARD.

In an implementation, the incremental learning and automatic relevance determination is achieved through maximum a posteriori (MAP) estimation.

In various other implementations: a forgetting factor is included in the clustering layer, latent variable layer and/or the automatic relevance determination; incremental automatic relevance determination is achieved by imposing an inverse gamma prior on all relevance parameters; incremental learning is achieved by imposing a gamma prior on the at least one model; and/or incremental automatic relevance determination is achieved by imposing an exponential prior to the activation of the at least one model. It is an advantage that exponential priors in factorization approaches using data according to the system and method described herein are enabled.

In an implementation, incremental learning is achieved by using a Poisson data likelihood.

In an implementation, the method further comprises any one or more of: anticipating an effect of adapting the clustering layer on the latent variable layer parameters; and anticipating the effect of adapting the clustering layer on the latent variable layer comprises adapting the latent variable layer, and performing model smoothing.

In implementations of the method, the at least one model is a word model; and/or the acoustic signal is a vocal expression or command.

Although only language acquisition is discussed herein, the proposed methods and systems, can also be applied in other fields as well, e.g. recognizing sounds or sound sequences that are not speech. In embodiments described herein, a method and system has been developed that improves incrementally using acoustic and semantic demonstrations and feedback from the user, thus offering viable, always learning and highly personalizable, speech recognition solutions for applications such as voice-enabled home automation, voice-enabled cars, wearable computing devices such as smart watches and smart bands, and voice-driven assistive aids.

It is an advantage that devices incorporating the system and method adapt to the user, instead of the other way around, more specifically embodiments described herein provide an interface that learns its vocabulary from the user. The user can teach the system by uttering a command and subsequently demonstrating the command through an alternative interface. From the demonstration, the important concepts are preferably extracted, called semantics, and the system is trained to link spoken words to these concepts. Potential applications for such an interface include home automation (domotics), smartphones/watches, automotive or robotics.

Figure 1A:
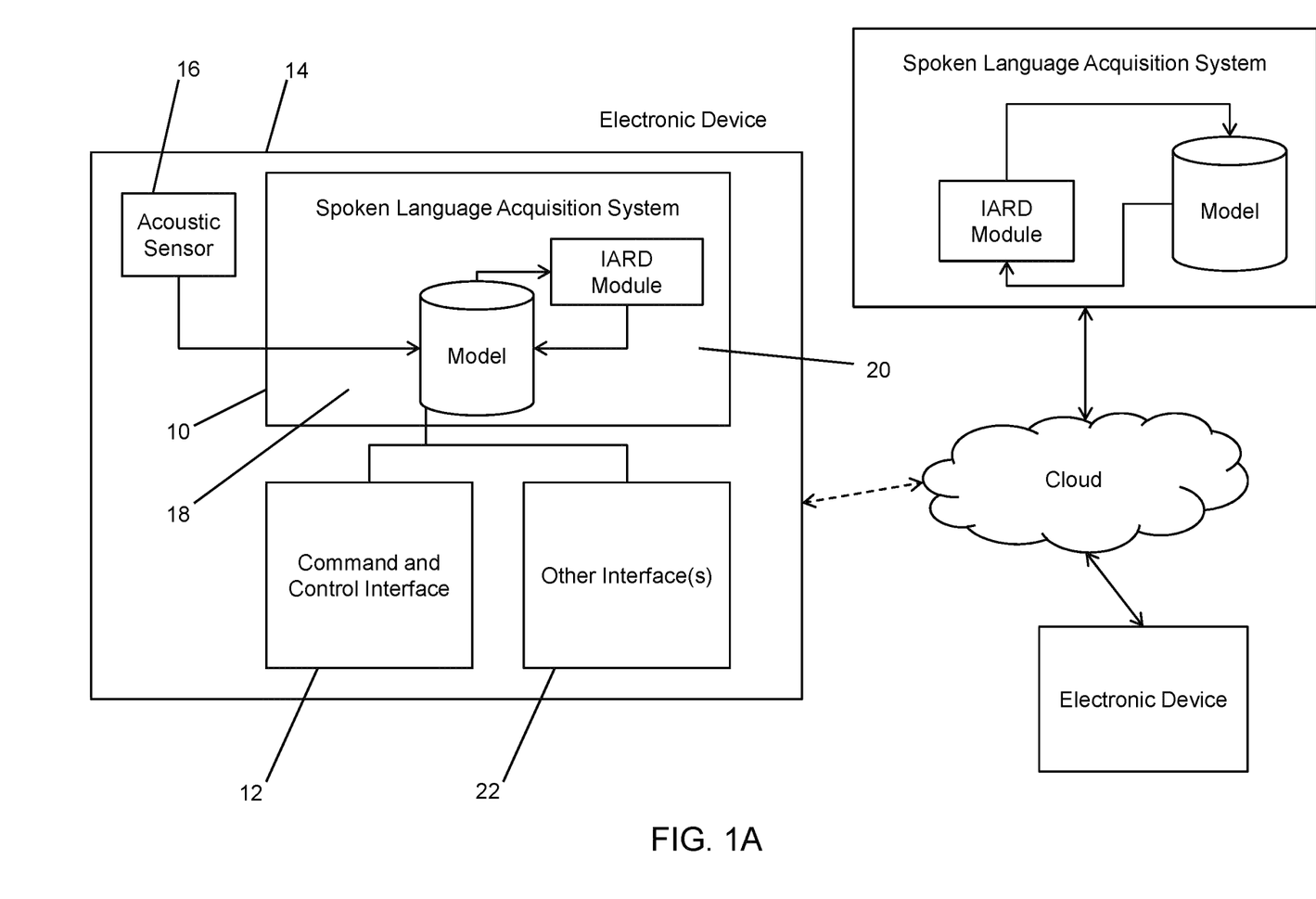
FIG. 1A is a block diagram of an electronic device having a spoken language acquisition system and a cloud-based spoken language acquisition system accessible to other electronic devices.

Implementations of the system described herein provide a spoken language acquisition system 10 as shown in FIG. 1A, preferably for a command-and-control interface 12 in an electronic device 14. The acquisition system 10 acquires an acoustic signal from an acoustic sensor 16 and utilizes processing capabilities and memory to implement an incremental automatic relevance detection (IARD) module 18 that builds and utilizes a model 20. In preferred embodiments the interface may learn a set of words through coupled commands and demonstrations from the user. Advantageously, the user can teach the system a new command by demonstrating the uttered command through an alternative interface 22. With these coupled commands and demonstrations, the system can learn the acoustic representations of the used words coupled with the meaning of semantics. Prior art methods use batch learning schemes to train the model, however when batch learning is used all the commands and demonstrations have to be kept in memory or on the storage space and the model has to be trained from scratch, which disadvantageously has high (even unbounded) memory needs. In contrast, embodiments of the system described herein provide a learning scheme where the models and associated dictionary of learned words can be updated when new data is presented. The models can automatically expand to add new words or shrink when old words are forgotten. The proposed system is tested on a speech recognition task where the system has been trained on a set of commands and users and needs to adapt to new users. The results, in the detailed description, show that the system can successfully adapt to the pronunciation of the new user and can expand the model and dictionary to incorporate new words.

Figure 1B:
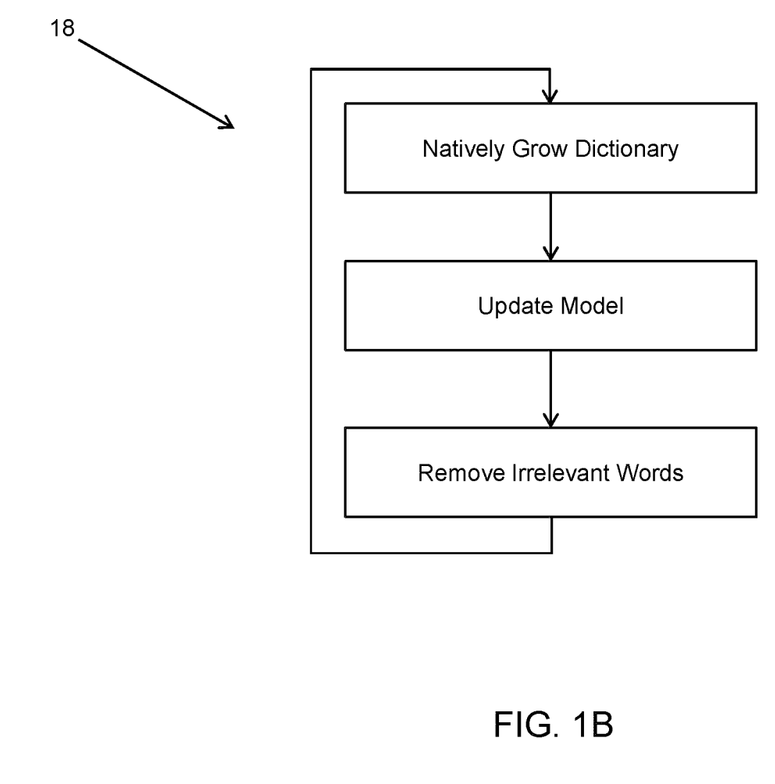
FIG. 1B is a flow chart illustrating computer executable operations for performing an incremental automatic relevance detection (IARD) process.

As shown in FIG. 1B, a natively grown dictionary can be used to update a model, with irrelevant words removed. This process can be repeated as the dictionary continues to grow. Details concerning these processes are provided below. Further details regarding processes for updating an existing model using new data can be found in co-pending PCT Application Nos. PCT/EP2015/075721 (published as WO 2016/188593) and PCT/CA2015/051257 (yet to be published), the contents of which are incorporated herein by reference.

It has been found that previous systems for vocabulary acquisition known in the art exploit data from the user only, which implies that until the user has demonstrated commands, the system cannot have acquired a single word (model) and will therefore not be able to map speech to semantics. In embodiments described herein, the model is preferably first trained on other users and then adapted to the current user. The system will therefore advantageously be able to recognize the current user's commands as of the first utterance, to extent that the other users resemble the current user. This is different from acoustic model adaptation generally known in the art of automatic speech recognition in that the adaptation involves both the pronunciation, lexical choice and mapping to semantic representation. The system can also adapt the number of models used to represent a semantic concept (=word, subword, multi-word expression of contiguous words or non-contiguous words that represent an object, property of an object or action) on the user's input. This is preferred as users may use different words or expressions as the "other users" mentioned above to refer to semantic concepts.

The system and method described herein also distinguishes from various prior patent art. For example, U.S. Pat. No. 7,124,081 concerns the adaptation of the LSA space. The LSA space is a continuous vector space built from a word-document co-occurrences (i.e. trained from TEXT documents containing WRITTEN words). Implementations of the system described herein use SPOKEN words as input in the adaptation process. The LSA space is used in the so-called language model, a component in a large vocabulary speech recognizer which assigns a probability to a "sequence of words" (sentence). Implementations of the system described herein does not use a language model. The system described in ZL915161 uses speech as input in the adaptation process. WO 2009/129315 describes a method in which the user is queried about specific information about a WORD.

Implementations of the system described herein does not query the user about syntactic, semantic, phonetic (pronunciation) or translation information of word. It asks merely for a DEMONSTRATION of the UTTERANCE-level meaning of the command, without querying the user about the meaning of a specific word. As such, both the level (word vs command or sentence) and the type of information are different from the prior art. Implementations of the system described herein do not use word class information, nor symbolic pronunciation information nor translation information, unlike WO 2009/129315, and does not ask the user for such specialist information.

Whereas in embodiments described herein, reference is made to "acoustic signal" reference may be made to any acoustical signal comprising a representation of at least an utterance or distinguishing sound which may be generated by the vocal chords of a human or animal. Moreover, the use of musical or sounds (like for example whistling or singing) or other sounds generated by a machine can be considered as acoustical input.

Whereas in embodiments described herein, reference is made to "clustering layer" reference may be made to a layer enabling clustering, which may comprise grouping a set of objects in such a way that objects in the same group (called a cluster) are more similar (in some sense or another) to each other than to those in other groups (clusters). Examples of clustering layer may be a Gaussian mixture model (GMM), k-means clustering, self-organizing maps, spectral clustering, vector quantization methods, neural networks, etc.

Whereas in embodiments described herein, reference is made to a "factorization layer", reference may be made to the decomposition of an object (for example, a number, a polynomial, or a matrix) into a product of other objects, or factors, which when multiplied together approximately give the original. Examples of factorization layer may be non-negative matrix factorization (NMF), neural networks, etc.

Whereas in embodiments described herein, reference is made to "self-taught", reference may be made to learning by demonstration.

Whereas in embodiments described herein, reference is made to "action state", reference may be made to a semantic representation of an action.

The system and method described herein can be implemented in several configurations, including in an application and module in a device or using a server client model in cloud infrastructure.

In embodiments described herein, at least one existing speech recognition model is trained incrementally when new, previously unseen, data is presented. Generally, an NMF model is trained through Maximum Likelihood Estimation (MLE). Incremental NMF learning is achieved through Maximum A Posteriori (MAP).

Updating the dictionary instead of learning from scratch is good for adaptation purposes, the pronunciation of the words can be adapted to better fit the user. However, when the user uses new words the dictionary should be expanded and, similarly, when the user does not use a word any more it should be removed from the dictionary. Since no transcription is available, it is unknown what words the user uses when new data is presented; therefore, it is difficult to know when the dictionary should be expanded. Embodiments of the present invention therefor use Automatic Relevance Determination (ARD) to advantageously solve this issue. With ARD the relevance of the words is learned together with the dictionary. When words are irrelevant, they can be removed from the dictionary. One can then make the very naive assumption that the user always uses new words, so the dictionary will always be expanded. If the added words prove to be irrelevant later on they can be removed. Just like incremental learning, ARD is achieved through MAP, similar to the technique proposed in [1]. This technique however is used in a batch setting, whereas in embodiments of the present invention a method to learn the relevance in an incrementally learning speech recognition system is proposed.

Embodiments described herein can contribute to at least one of the following: (1) The model assumptions for the incremental learning scheme being adapted to better fit the data, (2) the ARD learning scheme being adjusted for incremental leaning and (3) Incremental learning being combined with ARD to make Incremental ARD possible.

In embodiments described herein, a dictionary of spoken words is learned with NMF. NMF can find recurring patterns in the data by approximating the F×N non-negative data matrix V as a lower rank product of two non-negative matrices, the F×K dictionary matrix W and the K×N activation matrix H. Embodiments of the present invention use a setup wherein every pair of command and demonstration is represented as a stacked vector containing both the acoustics and the semantics. These (N) vectors are ordered adjacent to each other in the data matrix V. This stacked data matrix is decomposed to find a coupled dictionary W with K components, also containing acoustics and semantics and the component activations H:

$$\begin{bmatrix} V^s \\ V^a \end{bmatrix} \approx \begin{bmatrix} W^s \\ W^a \end{bmatrix} H \quad \text{(Eq. 1)}$$

$V^s$ and $V^a$ are the semantic and acoustic data matrices and $W^s$ and $W^a$ are the semantic and acoustic dictionaries. To find the semantic information of an unknown command the learned acoustic dictionary is used to find the component activations in the acoustics:

$$v^a \approx W^a h \quad \text{(Eq. 2)}$$

subsequently an estimate of the semantic data can be computed with the found activations and the learned semantic dictionary:

$$v^s \approx l = W^s h \quad \text{(Eq. 3)}$$

wherein/is then used to classify the command.

The acoustic representation used to create $V^a$ preferably is a Histogram of Acoustic Co-occurrences (HAC). A HAC vector contains counts of the co-occurrence of two acoustic events with a certain delay between them accumulated over the entire utterance. The acoustic events used in this paper are phones. A Deep Neural Network (DNN), like for example described in [3] may be used to extract phone posteriors from the speech signal. The HAC is then computed by accumulating the product of all possible pairs of phones with a fixed delay between them. This results in one fixed length acoustic feature vector per utterance, which can be used to construct the non-negative acoustic data matrix $V^a$.

The semantic data matrix $V^s$ contains semantic label vectors created based on demonstrations from the user. A semantic label vector contains an element for every possible concept that a user can use in a demonstration. This element is 1 if the concept is present or active in the demonstration and 0 otherwise. For example, in a domotics scenario a demonstration could be turning on the kitchen light. For this demonstration the semantic labels "turn on" and "kitchen light" will be activated.

Generally, in a batch learning scenario the matrix factors are inferred by maximizing the likelihood of the data.

Embodiments of the present invention pursue an incremental learning scheme and the relevance of the components is also learned. To this end extra relevance parameters are preferably added to the model, one per component, and the posterior probability of the model is maximized instead of the data likelihood:

$$(W \cdot H \cdot v) = \underset{(W \cdot H \cdot v)}{\mathrm{argmax}} P(W \cdot H \cdot v \mid V) \quad \text{(Eq. 4)}$$

with v a vector containing the relevance parameters. The posterior probability can be calculated as:

$$P(W \cdot H \cdot v \mid V) = \frac{P(V \mid W \cdot H) P(W) P(H \mid v) P(v)}{P(V)} \quad \text{(Eq. 5)}$$

The data prior P(V) is not a function of the model parameters, so it can be ignored. The likelihood of the batch P(V|W, H) will make sure the updated model fits the newly presented data well. A Poisson distribution is used as the likelihood function because it is appropriate to model count data, which is reasonable since the HAC vectors contain counts of acoustic event co-occurrences:

$$V_{fn} \sim \mathcal{P}\left(\sum_{k=1}^{K} W_{fk} H_{kn}\right) \quad \text{(Eq. 6)}$$

When a new batch of data is presented to the system the dictionary needs to be updated, not learned from scratch. The old dictionary needs to be remembered and the newly updated model should not be drastically different from the old one. Hence, the dictionary prior P(W) is used to make sure the updated dictionary stays close to the learned dictionary from the previous batch. A gamma distribution is used for the dictionary prior because it is conjugate to the Poisson distribution:

$$W_{fk} \sim \mathcal{G}(\alpha_{fk} \cdot \beta_{fk}) \quad \text{(Eq. 7)}$$

$\alpha_{fk}$ and $\beta_{fk}$ are the shape and scale parameters of the dictionary prior respectively. NMF suffers from scaling ambiguity, meaning that if a column of the dictionary is scaled and the row of its activations are inversely scaled an equivalent solution is obtained. To deal with this ambiguity the columns of W are preferably normalized so they sum to one. When the dictionary is (always) normalized, the scale parameters can be ignored and the dictionary prior becomes a Dirichlet distribution.

The relevance parameters represent how often a component is used. Correspondingly the learning should make sure only a limited number of relevant components are used to approximate the data. To encourage this kind of behavior an exponential distribution is chosen for the activation prior P(H|v):

$$H_{kn} \sim \varepsilon(v_k) \quad \text{(Eq. 8)}$$

The exponential distribution will push the activations to contain many zero values. The exponential distribution is a special case of the Gamma distribution, making it conjugate to the Poisson distribution. the relevance parameter is used as the scale parameter for the exponential distribution. This means that if the relevance of a component is small, it will encourage its activations to contain small values, meaning that it has only a small contribution in the approximation.

Finally the relevance prior P(v) is used to remember the relevance, similar to the dictionary prior. An Inverse-Gamma is preferably used for this prior, as proposed by Tan et al:

$$v_k \sim \mathcal{IG}(a_k \cdot b_k) \quad \text{(Eq. 9)}$$

$a_k$ and $b_k$ are the shape and scale parameter of the Inverse Gamma distribution.

The incremental learning scheme according to embodiments described herein may comprise two phases. First the cost function is iteratively minimized by updating the model. After iteration, the model prior parameters are updated so the newly learned model is remembered. The cost function is the negative log likelihood:

$$Q = -\log P(W \cdot H \cdot v \mid V) \quad \text{(Eq. 10)}$$

$$\stackrel{c}{=} \sum_{f=1}^{F} \sum_{n=1}^{N} [-V_{fn} \log(WH)_{fn} + (WH)_{fn}]$$

$$- \sum_{f=1}^{F} \sum_{k=1}^{K} [\alpha_{fk} \log(W_{fk})] + \sum_{n=1}^{F} \sum_{k=1}^{K} \left[\frac{H_{kn}}{v_k}\right]$$

$$- \sum_{k=1}^{K} \left[(N - a_k) \log(v_k) + \frac{b_k}{v_k}\right]$$

$\stackrel{c}{=}$ is equality up to a constant. Minimizing this cost function leads to the following update rules:

$$W_{fk} \leftarrow W_{fk} \sum_{n=1}^{N} \frac{V_{fn}}{(WH)_{fn}} H_{kn} - \alpha_{fk} \quad \text{(Eq. 11)}$$

$$H_{kn} \leftarrow H_{kn} \frac{\sum_{f=1}^{F} \frac{V_{fn}}{(WH)_{fn}} W_{fk}}{\sum_{f=1}^{F} W_{fk} - \frac{1}{v_k}} \quad \text{(Eq. 12)}$$

$$v_k \leftarrow \frac{\sum_{n=1}^{N} H_{kn} + b_k}{N + a_k} \quad \text{(Eq. 13)}$$

After each update of the dictionary it is normalized so its columns sum to one. After iteration the prior parameters of the next batch can be found by preferably combining the previous prior parameters with the accumulated statistics of the current batch:

$$\alpha_{fk}^{(j+1)} = W_{fk} \sum_{n=1}^{N} \frac{V_{fn}}{(WH)_{fn}} H_{kn} + \alpha_{fk}^{(t)} \quad \text{(Eq. 14)}$$

$$a_k^{(t-1)} = N + a_k^{(t)} \quad \text{(Eq. 15)}$$

$$b_k^{(t-1)} = \sum_{n=1}^{N} H_{kn} + b_k^{(t)} \quad \text{(Eq. 16)}$$

It may be noted that the expression for the dictionary shape parameter is identical to the update rule of the dictionary. The difference is that the dictionary is normalized after every update while the shape parameters are not. If the initial relevance prior parameters $a^{(0)}$ and $b^{(0)}$ are chosen as 0, as this corresponds to a uniform or uninformative prior, meaning that there is no prior information for the relevance, the relevance will be equal to the average activation of the component in all the batches, which is a very natural interpretation of relevance.

In equations (14)-(16) one can see that the sufficient statistics can only grow, because at every time-step only non-negative values are added to them. This causes the variance of the prior to decrease after every time-step, so the priors become more restrictive. This causes past examples to have the same impact as current examples, making it impossible to forget old information [2]. This problem is solved by introducing a forgetting factor for both the dictionary and the relevance. The forgetting factors range between zero to one. The priors are weakened by raising them to the power of the forgetting factor, thus weakening the past information after every model update, making it possible to forget old information. Raising the prior to a power is equivalent to scaling the sufficient statistics. Choosing the forgetting factors equal to zero corresponds to taking no past information into account (no memory). Choosing them equal to one corresponds to weighing all past information equally (no forgetting). The objective function with forgetting parameters is:

$$Q \stackrel{c}{=} -\log P(V|W \cdot H) P(W)^{\lambda} P(H|v) P(v)^{\phi} \qquad \text{(Eq. 17)}$$

$\lambda$ and $\Phi$ are the dictionary and relevance forgetting factors, both chosen between 0 and 1. The forgetting factors are introduced in the learning scheme by scaling the prior parameters with the forgetting factors, this will make sure the prior parameters are not always increasing.

As mentioned earlier the dictionary can grow by assuming the user always uses new words. Before iteration a component is added to the dictionary for every active label in the batch. To avoid growing the dictionary infinitely, columns of low relevance have to be removed. However, because the previous relevance is remembered, it can take a long time before the relevance drops to zero using the forgetting factor. Instead a component will be removed if it is not used for a number of consecutive batches. Components added for a certain batch will be removed immediately if they are not used for that batch.

EXAMPLES AND EXPERIMENTS

Database Example:

The database used in embodiments of the present invention is referred to as "Syncom". Syncom contains spoken commands from users for various electronic devices like a smartphone or a GPS. Each user recorded 3 sets of 16 commands. All sets contain the same semantic representations but the commands are given in a different way, e.g. "Skip this song" is a different command as "Play the next track" but the semantic representation is the same. In total 5 users have been recorded and every command was repeated 5 times. Not all commands that have the same semantics are completely different from each other. Some corresponding commands contain some keywords that are the same e.g. "Put on some jazz" and "Play some jazz".

Testing Scenario

The goal of these experiments is to evaluate the system's ability to add new words to the dictionary or remove them if they are no longer used and everything has to be learned incrementally. To test the system's ability to do so we simulated a user that changes their vocabulary while using the system. There are 2 phases in the testing scenario, a pre-change phase and a post-change phase. One or more sets (each containing 5 repetitions of 16 commands) are assigned to each phase. In the pre-change phase the system is trained and tested on commands from the sets assigned to it, then the user suddenly changes their behavior and in the post-change phase the system is trained and tested on commands from different sets. After the change the system should be able to adjust its dictionary to the new set of commands. In each phase, randomly selected batches of 16 commands from the sets assigned to it are presented to the system. When a batch is presented to the system, the dictionary is updated and tested on all unseen data in the assigned sets. For example, if 2 sets are assigned to the pre-change phase, it means that a total of 160 commands in 10 batches are used for training and testing in this phase. The system is tested in a leave-one-out-fashion, i.e., only one batch is presented to the system for training, and the system is tested on the remaining 9 batches. In the next step, another batch is presented to the system as training, and the system is again tested on the remaining 8 batches. This is repeated until 9 batches have been presented to the system and only 1 test batch remains. After testing the system on the last batch, this batch is presented to the system and the post-change phase starts.

All possible combinations of sets assigned to the phases are tested. Every combination is put into a group of similar combinations, every one of these groups is called a scenario:

1 set is assigned to the pre-change phase and a different set is assigned to the post-change phase. This scenario is referred to as (1-1)

2 sets are assigned to the pre-change phase and the remaining one to the post change phase. This is referred to as (2-1)

1 set is assigned to the pre-change phase and the remaining two to the post change phase. This is referred to as (1-2)

3 sets are assigned to the pre-change phase. There are no more remaining sets, so there is no post change phase in this scenario. This is referred to as (3-0)

For every scenario, all possible set combinations are tested for all users and each one of these experiments is repeated 10 times. The experiments for different users are completely independent because the system is trained in a fully speaker dependent way. The average results for all these experiments is reported. Because the data is presented to the system in a random order, the outcome is different for each repetition of the experiment.

A baseline incremental learning is used without ARD, and is referred to as "base". Since no relevance determination is being done, the dictionary cannot be pruned. No columns can thus be added since this would cause the dictionary to grow forever. For the system without ARD the model order thus stays fixed to the initial model order. For the system with ARD for every batch a column is added for every active label in the batch.

Results

The average accuracy in function of the number of presented batches can be found in Table I. Every column of the table corresponds to a testing scenario described above. The results are shown for the proposed system (labeled as ARD) and the "base" system. The leftmost column shows the number of batches of 16 commands that have already been presented to the system. The horizontal line marks the point where the users change their behavior.

It can be seen that the accuracy increases until the users change their behavior. After the change the accuracy drops, which is expected as the system does not know these new words yet. At this point, the system starts adapting to the new vocabulary and the accuracy starts increasing again. A major observation and contribution of this work is that the system with ARD performs better than the system without ARD at all times. Furthermore, after the change in user behavior, the system with ARD is able to recover much faster than the "base" system. This is due to the fact that the system with ARD can add words to the dictionary that will model the new words. The system without ARD however has to forget an old word before learning a new word.

TABLE I

Average keyword accuracy in function of the number of presented batches for all scenarios, tested on Syncom.

|    | 3-0  |      | 2-1  |      | 1-2  |      | 1-1  |      |
|----|------|------|------|------|------|------|------|------|
|    | ARD  | base | ARD  | base | ARD  | base | ARD  | base |
| 1  | 55.0 | 54.0 | 57.9 | 56.6 | 69.1 | 68.6 | 68.6 | 68.8 |
| 2  | 71.9 | 69.0 | 76.3 | 72.9 | 88.7 | 87.5 | 89.1 | 84.7 |
| 3  | 79.7 | 76.3 | 85.2 | 80.4 | 95.3 | 92.1 | 95.8 | 91.2 |
| 4  | 84.4 | 80.6 | 89.1 | 84.3 | 98.0 | 93.1 | 97.8 | 93.1 |
| 5  | 87.8 | 83.1 | 92.0 | 86.6 | 64.2 | 62.2 | 64.0 | 61.5 |
| 6  | 90.2 | 84.6 | 93.0 | 88.3 | 76.2 | 70.8 | 80.8 | 74.7 |
| 7  | 90.4 | 85.6 | 93.8 | 89.2 | 83.1 | 76.7 | 90.1 | 82.2 |
| 8  | 91.3 | 86.4 | 94.6 | 90.3 | 86.7 | 80.3 | 93.8 | 86.4 |
| 9  | 92.6 | 87.1 | 94.4 | 91.3 | 90.1 | 83.4 | 95.6 | 88.1 |
| 10 | 92.1 | 88.3 | 73.5 | 70.8 | 92.6 | 85.0 |      |      |
| 11 | 91.0 | 87.7 | 84.1 | 77.4 | 93.4 | 86.2 |      |      |
| 12 | 92.1 | 87.6 | 89.8 | 82.4 | 94.2 | 87.3 |      |      |
| 13 | 91.5 | 88.0 | 93.5 | 85.3 | 94.0 | 88.3 |      |      |
| 14 | 91.5 | 86.7 | 95.7 | 86.7 | 94.4 | 88.9 |      |      |

Figure 2:
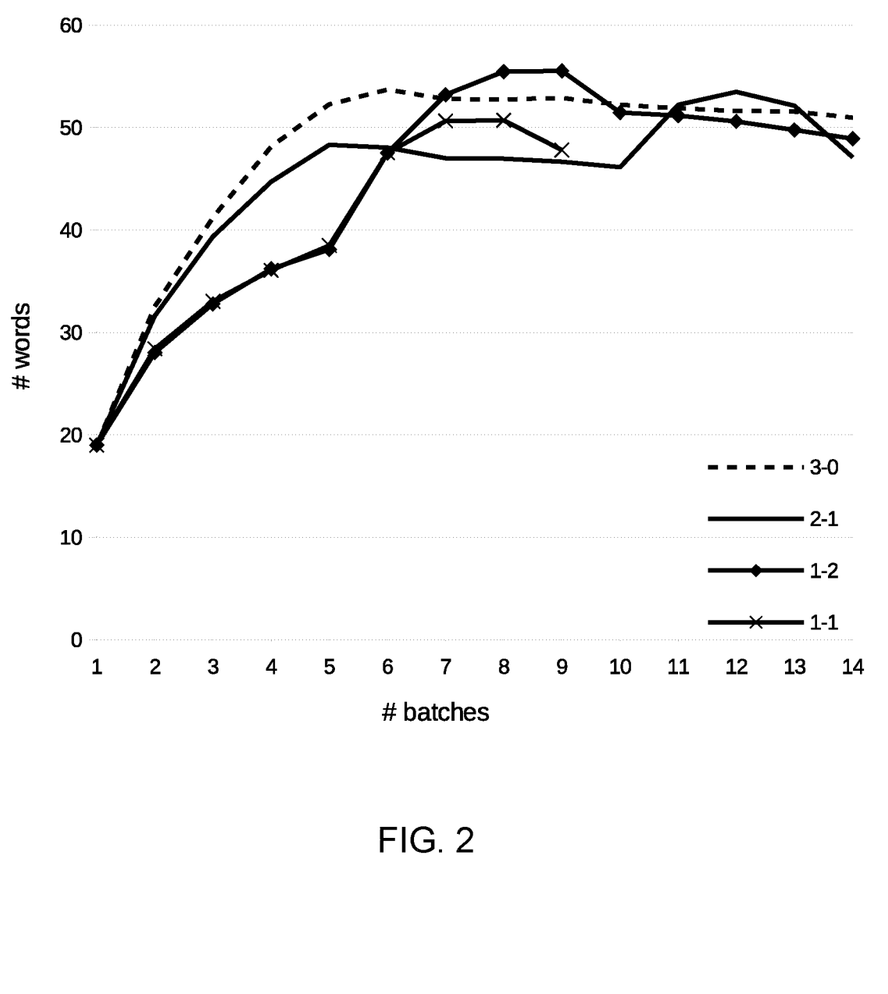
FIG. 2 is a chart illustrating an average model order in function of the number of presented batches for all scenarios, tested on an experimentally derived database.

The average model order in function of the number of batches can be seen in FIG. 2. Only the system with ARD is shown, because the dictionary size for the system without ARD stays constant at the initial dictionary size. In the pre-change phase the model order converges to a constant value, this value is dependent on the number of command sets in the pre-change phase. The point where the change happens for the two scenarios with one set assigned to the pre-change phase is at 5 batches. At this point one can see that scenarios with more sets in the pre-change phase have a bigger dictionary, which is expected. After the change the size increases because the system is detecting new words and is adding them to the dictionary. However, sometime after the change, the dictionary size starts dropping again because the words that are no longer used are being removed now. When one compare the post-change behavior of the 1-1 scenario to that of the 1-2 scenario, one can see that the 1-2 scenario grows to a larger dictionary than the 1-1 scenario. This is because there are more sets assigned to the post-change phase.

Embodiments of the present invention provide methods to incrementally learn the relevance of words in a dictionary has been proposed. The relevance can be used to prune the dictionary, making it possible to grow and shrink the dictionary automatically when new words have to be learned or old words forgotten. The proposed system is tested and compared to a system that does not learn the relevance of the words. The results show that growing the dictionary, made possible by ARD, helps the system to learn new words quicker and a more appropriate model order is obtained giving better asymptotic performance.

The above has been described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the electronic device, cloud system, spoken language acquisition system, IARD module, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

REFERENCES

[1] Vincent Y F Tan and Cédric Févotte, "Automatic relevance determination in nonnegative matrix factorization with the beta-divergence," Pattern Analysis and Machine Intelligence, IEEE Transactions on, vol. 35, no. 7, pp. 1592-1605, 2013.
[2] Joris Driesen and Hugo Van hamme, "Modelling vocabulary acquisition, adaptation and generalization in infants using adaptive bayesian PLSA," Neurocomputing, vol. 74, no. 11, pp. 1874-1882, 2011.
[3] Hinton et. Al. "DNNs for acoustic modeling in speech recognition: The shared views of four research groups" in Signal Processing Magazine, IEEE, vol. 29, nr. 6, pp. 82-97 (2012).

The invention claimed is:

1. A method of processing acoustic signals, the method comprising:
   obtaining at least one pre-existing speech recognition model;
   adapting the at least one pre-existing speech recognition model to a user's vocabulary over time by one or more of:
   learning new words; and
   removing words no longer being used by the user, wherein adapting the at least one pre-existing speech recognition model comprises:
   receiving previously unseen user-specific data comprising one or more of:
   acoustic signals;
   user action demonstrations; and
   semantic information about a meaning of an acoustic signal; and
   incrementally updating the at least one pre-existing speech recognition model by associating acoustic signals with input semantic frames to enable recognition of new or changed input acoustic signals, wherein the incrementally updating comprises adapting one or more of a clustering layer and a latent variable layer, wherein the clustering layer uses one or more of:
   a deep neural network (DNN);
   a convolutional neural network (CNN);
   a recurrent neural network (RNN) with long short term memory (LSTM) units; and
   a recurrent neural network (RNN) with gated recurrent units (GRU);
   generating a semantic frame from an input acoustic signal using one or more of the at least one pre-existing speech recognition models;
   mapping the semantic frame to a predefined action; and
   performing the predefined action when the mapping is successful.

2. The method of claim 1, wherein said at least one pre-existing speech recognition model comprises a dictionary for the acoustic signals and a set of activations or weights for the dictionary.

3. The method of claim 1, wherein the clustering layer is trained on one or more of:
   a separate vocabulary speech recognition database;
   the pre-existing speech recognition model; and
   a database of known acoustic signals.

4. The method according to claim 1, wherein in the latent variable layer or the clustering layer comprises one or more of a non-negative matrix factorization (NMF), histogram of acoustic co-occurrence (HAC), deep neural network (DNN), convolutional neural network (CNN), and recurrent neural network (RNN) that associates input features into the layer to the semantics are trained.

5. The method according to claim 1, wherein the clustering layer and the latent variable layer are trained on one or more of:
   a separate vocabulary speech recognition database in advance; and
   the pre-existing speech recognition model or database of acoustic signals.

6. The method of claim 1, wherein the latent variable layer is incrementally learned using automatic relevance determination (ARD) or incremental ARD.

7. The method according to claim 1, wherein mapping the semantic frame to a predefined action comprises incrementally updating the latent variable layer.

8. The method according to claim 1, wherein the semantic frames are generated from user actions performed on an alternate, non-vocal user interface.

9. The method according to claim 1, wherein the semantic frames are generated from automatically analyzing text associated with input acoustic signals.

10. The method according to claim 1, wherein semantic concepts of the semantic frames are relevant semantics that a user refers to when controlling or addressing a device or object by voice using a vocal user interface (VUI).

11. The method according to claim 1, wherein semantic concepts of semantic frames are predefined and a vector is composed in which entries represent a presence or absence of an acoustic signal referring to one of the predefined semantic concepts.

12. The method of claim 1, wherein, when a plurality of models is learned, the relevance of each model in the plurality of models is determined automatically.

13. The method of claim 12, wherein, when a plurality of models is learned, each irrelevant model in the plurality of models is removed.

14. The method of claim 12, wherein, when a plurality of models is learned, a required number of models is incrementally learned through incremental automatic relevance (IARD) detection.

15. The method of claim 12, wherein, when a plurality of models is learned, the number of models is increased upon receiving a new acoustic signal and irrelevant models are removed using automatic relevance detection.

16. The method of claim 1, wherein the incremental learning and automatic relevance determination are achieved through maximum a posteriori (MAP) estimation.

17. The method of claim 1, wherein a forgetting factor is included in the clustering layer, latent variable layer and/or the automatic relevance determination.

18. The method of claim 1, wherein incremental automatic relevance determination is achieved by imposing an inverse gamma prior on all relevance parameters.

19. The method of claim 1, wherein incremental learning is achieved by imposing a gamma prior on the at least one model.

20. The method of claim 19, wherein the incremental automatic relevance determination is achieved by imposing an exponential prior to the activation of the at least one model.

21. A non-transitory computer readable medium comprising computer executable instructions for performing the method of claim 1.

22. A system for processing acoustic signals, the system comprising:
a processor for executing instructions; and
memory comprising computer executable instructions which when executed configure the system to:
obtain at least one pre-existing speech recognition model;
adapt the at least one pre-existing speech recognition model to a user's vocabulary over time by one or more of:
learning new words; and
removing words no longer being used by the user,
wherein adapting the at least one pre-existing speech recognition model comprises:
receiving previously unseen user-specific data comprising one or more of:
acoustic signals;
user action demonstrations; and
semantic information about a meaning of an acoustic signal; and
incrementally updating the at least one pre-existing speech recognition model by associating acoustic signals with input semantic frames to enable recognition of new or changed input acoustic signals, wherein the incrementally updating comprises adapting one or more of a clustering layer and a latent variable layer, wherein the clustering layer uses one or more of:
a deep neural network (DNN);
a convolutional neural network (CNN);
a recurrent neural network (RNN) with long short term memory (LSTM) units; and
a recurrent neural network (RNN) with gated recurrent units (GRU);
generate a semantic frame from an input acoustic signal using one or more of the at least one pre-existing speech recognition models;
map the semantic frame to a predefined action; and
perform the predefined action when the mapping is successful.

23. The system of claim 22, wherein the system comprises a cloud-based device for performing cloud-based processing.

24. The system of claim 23 wherein the system further comprises an acoustic sensor for receiving acoustic signals.

* * * * *